Jan. 17, 1933.  R. MORGAN ET AL  1,894,911
HEADLIGHT TESTING APPARATUS
Filed Feb. 25, 1930  2 Sheets-Sheet 1
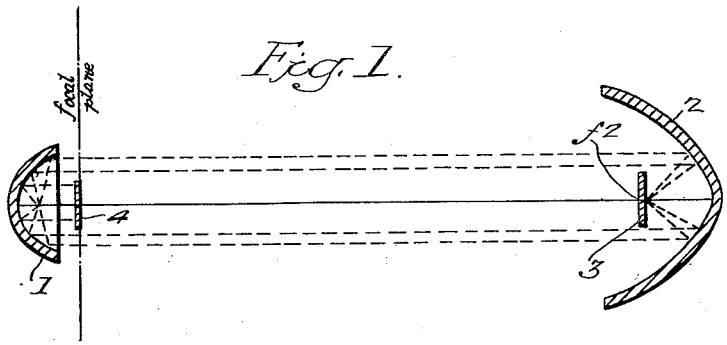
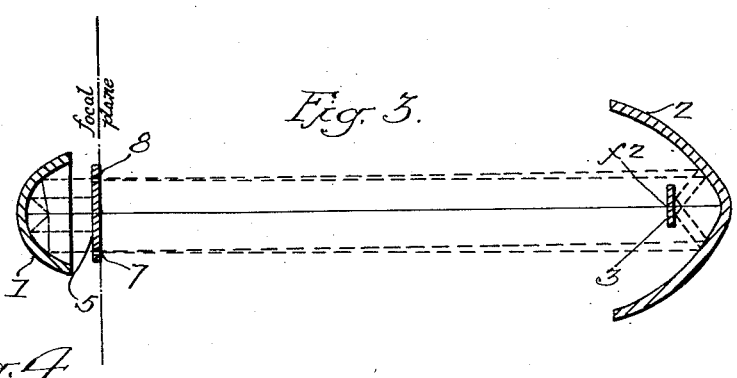
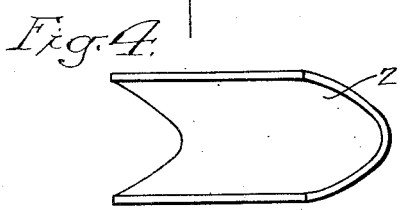
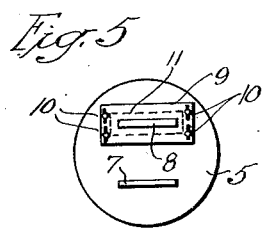
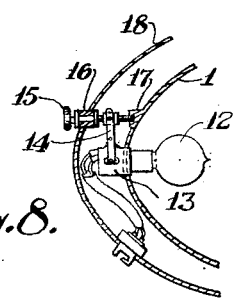
Inventors
Raymond Morgan
Enos F. Witmer
by their Attorneys
Howson & Howson

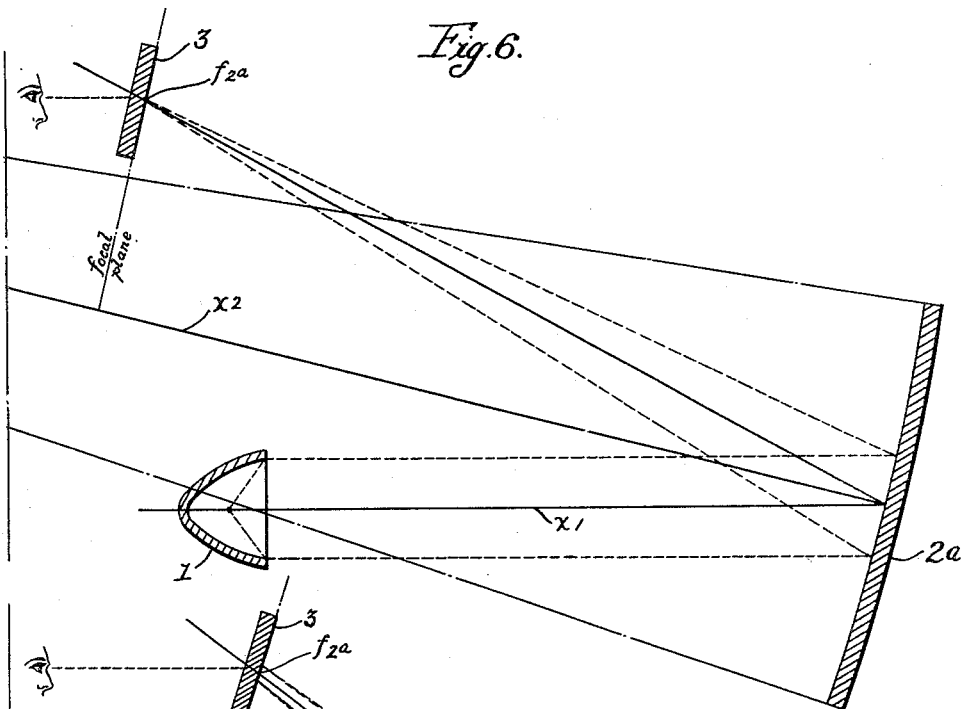
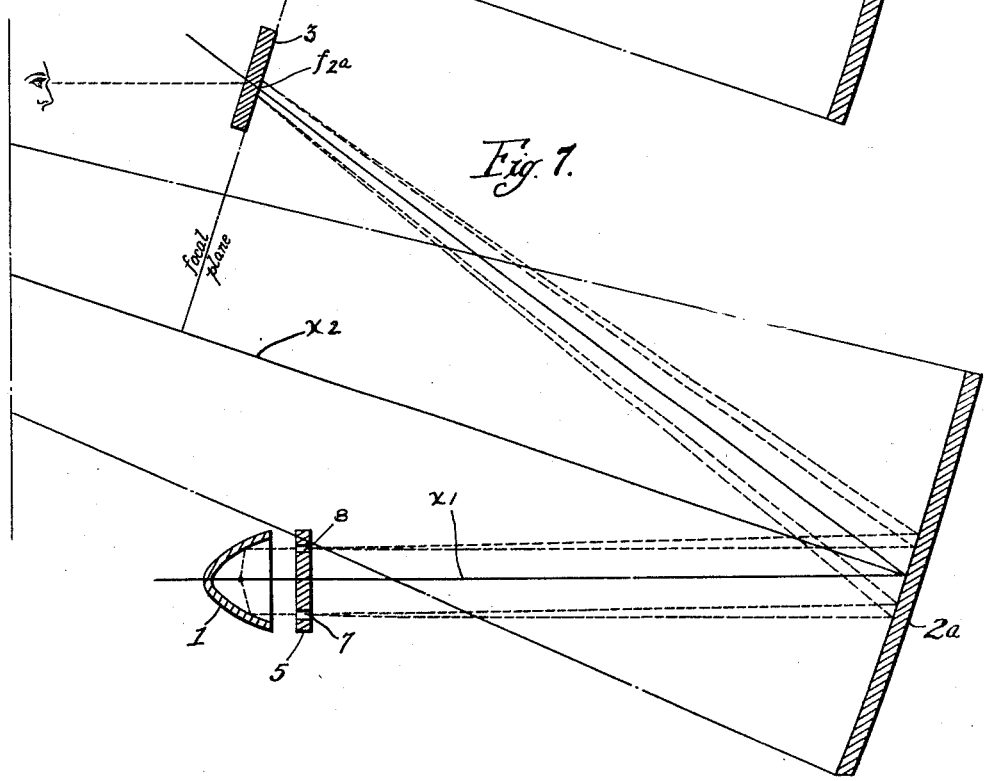

Patented Jan. 17, 1933

1,894,911

UNITED STATES PATENT OFFICE

RAYMOND MORGAN AND ENOS E. WITMER, OF PHILADELPHIA, PENNSYLVANIA

HEADLIGHT TESTING APPARATUS

Application filed February 25, 1930. Serial No. 431,248.

The present invention relates to headlight testing apparatus and particularly refers to an improved method and apparatus for focusing and adjusting automobile headlights. The subject matter disclosed in Figs. 1 to 5 hereof and the description relative thereto will be found in our co-pending application, Serial No. 334,581, filed Jan. 23, 1929.

The principal object of the invention is to provide a method and apparatus for focusing and adjusting headlights, as, for example, automobile headlights, which shall be capable of operation in relatively restricted spaces as compared to prior methods which require a distance of some twenty-five to fifty feet for carrying out the operations.

Another object is to provide focusing and adjusting means of the type set forth which shall be universally applicable for all types of headlight lens and which may be used with the lens removed or attached.

Other objects and advantages of the invention will appear more fully hereinafter from the following detailed description taken together with the accompanying drawings, in which:

Fig. 1 is a diagrammatic vertical sectional view illustrating an embodiment of our invention;

Fig. 2 is a detail front view of one of the elements of the apparatus shown in Fig. 1;

Fig. 3 is a modification of the embodiment shown in Fig. 1;

Fig. 4 is a perspective view of the parabolic reflector used in the apparatus of Figs. 1 and 3;

Fig. 5 is a detail front view of the element used in Figs. 3 and 7;

Fig. 6 is another embodiment of our invention;

Fig. 7 is a modification of Fig. 6; and

Fig. 8 is a partial view of a headlight showing a practical means for adjusting the light source to focus the same which may be used in the headlights shown diagrammatically in the other figures.

The present generally used methods of focusing the headlights of automobiles are undesirable by reason first, that they require for operation a relatively large space generally from twenty-five to fifty feet in length and secondly, that they are not universally effective for the many different types of lens now in general used. In accordance with the present invention, we have devised a simple and highly efficient method and apparatus, (universally effective for all types of lens,) whereby the headlights may be focused and adjusted in a very limited space.

Referring to the drawings, in Fig. 1, we have illustrated an embodiment of the method and apparatus for carrying out our invention and, in this instance, an elongated parabolic reflector 2 is used to bring the rays of light from the headlight reflector 1 to a focus within the normal conjugate focus of the headlight. In connection with the reflector 2, we employ a ground glass plate 3 (Fig. 2) which is located on the principal axis of the reflectors 1 and 2 and constituting the principal focus $f_2$ of the reflector 2. If the beam of light issuing from the headlight is convergent or divergent, the pattern of light on the ground glass screen 3 will be broad and diffused, but if the beam is substantially parallel in a vertical plane, the rays will come to a focus on the ground glass screen 3 and the pattern will consist of a narrow horizontal band of light. In other words, the process of focusing on the ground glass screen 3 is precisely the same as the usual process of focusing on a screen twenty-five or fifty feet distant, that is, by reducing the width of the beam of light in a vertical direction to a minimum.

The distance between the reflectors 1 and 2 may vary largely but generally two to four feet will be found desirable in the practice of our invention. It may be desirable to employ a shield 4 to prevent rays of light from the headlight falling directly upon the glass plate 3, as indicated in Fig. 1.

In Fig. 3 is shown a modification quite similar to that of Fig. 1 with the exception that in the place of the shield 4, a disk 5 is substituted which has a pair of slits 7 and 8 so that only a portion of the light from the reflector 1 is transmitted to the reflector 2. The light issuing from the slits 7 and 8 diverges to a slight extent and strikes the reflector 2 as indicated. The process of focusing, in this instance, will then consist in bringing the two light bands from the slits 7 and 8 into coincidence on the ground glass plate 3 which is at the principal focus $f_2$ of the reflector 2 as in Fig. 1. When the two light bands are coincident, it is an indication that the rays reflected from the reflector 1 are substantially parallel. The focusing, of course, may be accomplished in the usual way by moving the sources of light until the images of the slits are coincident indicating vertical parallelinity of the rays from the reflector 1 as explained.

Fig. 5 illustrates in detail the disk 5 for transmitting only a portion of the light from the reflector 1 and constitutes an element 5 with one fixed slit 7 and an adjustable slit 8, this slit being formed in a plate 9 adjustably fitted on the element 5 as indicated and the latter element being cut away in part at 11 in back of the adjustable plate 9 to permit the slit 8 to function. The plate 9 may be adjusted by means of the butterfly nuts 10. This adjustable disk is provided so that the testing apparatus may be adapted for use with many different sizes and designs of headlight lens which are encountered in general practice. In certain of these lenses, one or both of the slits 7 or 8, when the element is properly arranged with respect to the headlight, may fall in front of a horizontal irregularity or discontinuity in the surface of the headlight lens and, thereby, cause an undue amount of vertical spreading of the light coming through the slit or slits. It is therefore, desirable to provide an adjustment for varying the distance between the two slits until clearly defined images are produced. This construction will also be useful in dealing with types of lens in which the prism angle for the top part is sufficiently different from the prism angle of the lower part to cause an appreciable deviation from vertical parallelinity of the two beams issuing from the slits 7 and 8 when the light source is at the principal focus of the reflector.

In Fig. 6 is shown a modification in which a reflector $2a$ having a relatively large focal length is substituted for the reflector 2 illustrated in Figs. 1 and 3 and may be an elongated surface, the vertical section of which may be an arc of a circle or a parabola having a relatively large focal length, for example, of from two to four feet. The relatively large focal length brings the image or pattern closer to the light source and consequently closed to the operator of the apparatus, thereby reducing the distance between the headlamp and the reflector $2a$, thus saving space for carrying out the testing operations and producing a larger image approximating as closely as possible the pattern obtined on a screen twenty-five or fifty feet distant. In this instance, the automobile reflector 1 is not positioned on the principal axis $x_2$ of the reflector $2a$ as in Figs. 1 and 3, but on an axis $x_1$ adjacent thereto and convergent in a vertical plane therewith towards the reflector $2a$, i. e., its own principal axis or the axis of projection of the light source is adjacent and substantially convergent with the principal axis of the reflector $2a$. The ground glass plate 3 is positioned in the principal focal plane of the reflector $2a$ which is perpendicular to the principal axis $x_2$ of the reflector $2a$ and an image or pattern reflected thereon may be readily viewed by the operator without necessitating reflecting mirrors, inasmuch as the plate 3 is out of line with the reflector 1. By this arrangement, the light issuing from the reflector 1 is also prevented from directly striking the plate 3. As indicated in the figure, the rays are reflected from the source by the reflector 1 and onto the reflector $2a$ by means of which they are brought to a focus on the plate 3, at the focus $f_2$. If the rays issuing from the reflector 1 are not parallel, the image or pattern on the plate 3 will be diffused. The source of light is then adjusted so that a clear and defined image or pattern is reproduced on the plate 3 which indicates that the reflected rays are substantially parallel in a vertical plane.

The modification of Fig. 7 is similar to that of Fig. 6 except that the element 5 is placed in front of the reflector 1 so that only a portion of the light is transmitted to the reflector $2a$ as in the case of Fig. 3. Here again, the pattern reproduced on the ground glass plate 3 will constitute two horizontal bands of light and vertical parallelinity of the reflected rays from the reflector 1 will be indicated by the coincidence of the two bands of light on the plate 3.

In Fig. 8 there is shown a practical headlight construction wherein the light source or lamp is adjustable with respect to its reflector to focus the device. It might be well to explain the process of focusing a headlight at this time. This process consists in adjusting the position of the light source along the principal axis of its reflector until it lies at the principal focal point of the reflector, at which time the rays of light reflected from the device will be parallel. In the device of Fig. 8, the lamp 12 is removably carried by socket 13 which is in turn supported by carriage member 14. This member threadedly engages adjusting screw 15 which is suitably journaled in bearings 16 and 17 carried by casing 18 and reflector 1 respectively. Obviously by turning screw 15, the lamp is caused to move along the principal axis of reflector 1 and may be suitably focused as described above. This specific construction or any other conventional focusing means may of course be used in the headlights shown diagrammatically in the other figures.

While we have shown several modifications of our invention for the purposes of illustration and description, other changes and modifications therein may be apparent to those skilled in the art and we, therefore, desire to be limited only by the scope of the appended claims.

We claim:

1. The method of testing and adjusting a headlight adapted to reflect a beam from a source of light, which comprises isolating a plurality of components of said reflected beam, intercepting said components by means of a curved reflecting surface, obtaining an image or pattern of each of said components in the principal focal plane of said curved reflecting surface, and adjusting said source of light until the images or patterns of said components are brought into substantial coincidence.

2. The method of testing and adjusting a headlight adapted to reflect a beam from a source of light, which comprises isolating a plurality of components of said reflected beam, intercepting said components by means of a curved reflecting surface, obtaining an image or pattern of each of said components, in the principal focal plane of said curved reflecting surface, adjusting the distance between the components until the images or patterns are clearly defined, and adjusting the source of light until the images are brought into substantial coincidence.

3. The method of testing and adjusting a headlight adapted to reflect a beam from a source of light, which comprises isolating a plurality of components of said reflected beam, intercepting said components and deflecting them to obtain an image or pattern of each of said components on an axis adjacent and substantially convergent with the axis of projection of said source of light, adjusting the distance between the components at their source until their images or patterns are clearly defined, and adjusting the source of light until the images of said components are brought into substantial coincidence.

4. Apparatus for testing and adjusting a headlight having a source of light, a reflector for reflecting a beam from said source, and means for adjusting the light source with respect to said reflector, comprising means for dividing said beam into components, a curved reflecting surface for intercepting said components, and means for obtaining an image or pattern of each of said components in the principal focal plane of said reflecting surface, whereby the light source may be adjusted to bring the images or patterns of said components into substantial coincidence.

5. Apparatus for testing and adjusting a headlight having a source of light, a reflector for reflecting a beam from said source, and means for adjusting the light source with respect to said reflectors comprising means for dividing said beam into components, a curved reflecting surface for intercepting said components, the principal axis of said reflecting surface being adjacent and substantially convergent in a vertical plane with the principal axis of said first-mentioned reflector, and means for obtaining an image or pattern of each of said components in the principal focal plane of said reflecting surface, whereby the light source may be adjusted to bring the images or patterns of said components into substantial coincidence.

6. Apparatus for testing a headlight having a source of light, and a reflector for reflecting a beam from said source, comprising means for dividing said beam into components, a curved reflecting surface for intercepting said components, the principal axis of said surface being adjacent and substantially convergent with the principal axis of said first-mentioned reflector, and means for obtaining an image or pattern of each of said components in the principal focal plane of said surface, said surface having a relatively large focal length, whereby the images or patterns may be brought closer to said source to reduce the distance between said surface and said source.

7. Apparatus for testing and adjusting a headlight, having a source of light, a reflector for reflecting a beam from said source, and means for adjusting the light source with respect to said reflector, comprising means for dividing said beam into components, a curved reflecting surface for intercepting said components, means for obtaining images or patterns of each of said components in the principal focal plane of said reflecting surface, and means for adjusting the distance between said components to more clearly define said images or patterns, whereby the light source may be adjusted to bring said images into substantial coincidence.

8. Apparatus for testing and adjusting a headlight having a source of light, a reflector for reflecting a beam from said source, and means for adjusting the light source with respect to said reflector, comprising means for dividing said beam into components, a curved reflecting surface for intercepting said components, the principal axis of said surface being adjacent and substantially convergent with the principal axis of said first-mentioned reflector, means for obtaining an image or pattern of each of said components in the principal focal plane of said surface, said surface having a relatively large focal length whereby said images or patterns may be brought closer to said light source to reduce the operating distance between said surface and said source, and means for adjusting the distance between said components at their source to more clearly define said images or patterns, whereby the light source may be adjusted to bring said images or patterns into substantial coincidence.

RAYMOND MORGAN.
ENOS E. WITMER.